May 28, 1968  R. F. HUNTER  3,385,788
PROCESSES FOR OPERATING FIXED BEDS OF ACTIVE MEDIA
Filed Jan. 29, 1965  3 Sheets-Sheet 1

INVENTOR.
ROBERT FREDERICK HUNTER
BY
PATENT AGENT

United States Patent Office 3,385,788
Patented May 28, 1968

3,385,788
PROCESSES FOR OPERATING FIXED BEDS
OF ACTIVE MEDIA
Robert F. Hunter, 2351 1st St., Burlington,
Toronto, Ontario, Canada
Filed Jan. 29, 1965, Ser. No. 428,901
9 Claims. (Cl. 210—35)

ABSTRACT OF THE DISCLOSURE

Process of treating a liquid solution such as tap water and sea water to remove components such as calcium and magnesium ions from the solutions in which the solutions are passed vertically through fixed beds of particles such as ion exchange resin particles and the beds are regenerated by passing a liquid regenerant vertically through the bed. The liquids used in the process are alternately passed into the bed from opposite ends of the bed so that whenever two liquids are in contact the more dense of the two liquids is below the less dense liquid.

---

This invention relates to a process of treating a liquid solution containing a component to remove at least a part of the component from the solution by passing the solution through a fixed bed of particles capable of taking up the component from the solution.

In such processes there is a solution treatment step in which the solution is passed vertically through the bed, a regeneration step in which a regenerant liquid is passed vertically through the bed, and in order to prevent intermixing of the solution and regenerant, there may be rinse steps before and/or after the regeneration step in which a liquid rinse is passed vertically through the bed.

The liquid remaining in the bed after each step is displaced from the bed by the liquid next passed into the bed. However, little consideration has been given to the relative densities of the liquids passed into the bed, and at some stage in the process a liquid is passed into the bed from the bottom after a more dense liquid has been passed through the bed or a liquid is passed into the bed from the top after a less dense liquid has been passed through the bed. When this takes place there is an intermixing of the two liquids in contact with consequent loss in efficiency.

The use of a rinse step between the regeneration and solution treatment steps avoids the intermixing of the solution and regenerant liquids, but results in an increase in the off-time of the cycle, and there is still a problem of the intermixture of the rinse liquid with the solution and regenerant liquids.

According to this invention, a process is provided in which whenever two liquids are in contact during the cycle, the more dense of the two liquids is below the less dense. This is accomplished by passing the liquids into a column containing the bed alternately from the top and the bottom of the column so that liquid remaining in the column from the preceding step is displaced from the column by the liquid next passed into the column. The liquid next passed into the column is passed into the column from the top if it is less dense than said liquid remaining in the column from the preceding step, and is passed into the column from the bottom if it is more dense than said liquid, so that liquid remaining in the column from the preceding step is displaced from the column at the bottom if it is more dense than the liquid next passed into the column and is displaced from the column at the top if it is less dense than said liquid.

It is an object of this invention to increase the efficiency of the process by reducing the intermixing of the liquids passed through the bed.

It is a further object of this invention to reduce the off-time of the cycle by eliminating the rinse step.

Figure 3:
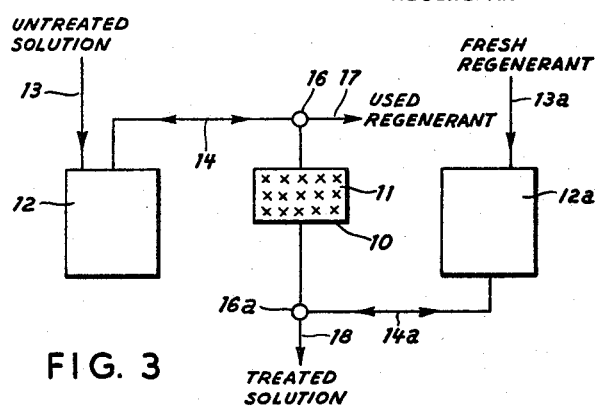
Figure 4:
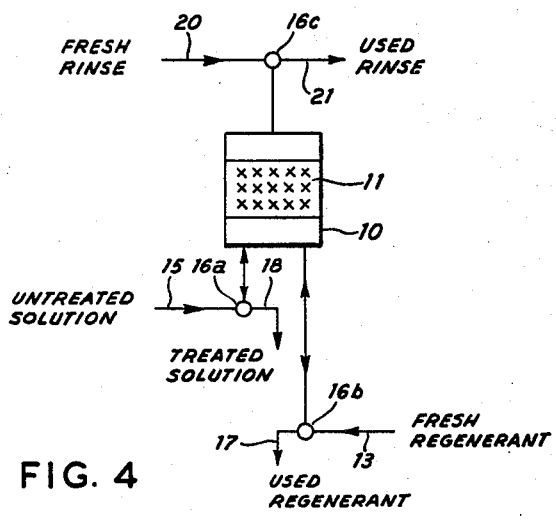
Figure 6:
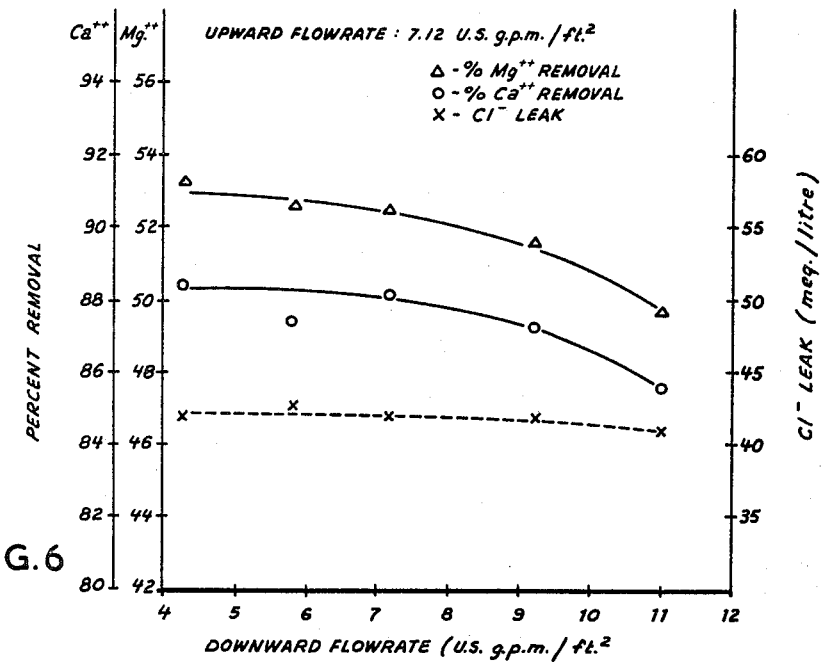
Figure 5:
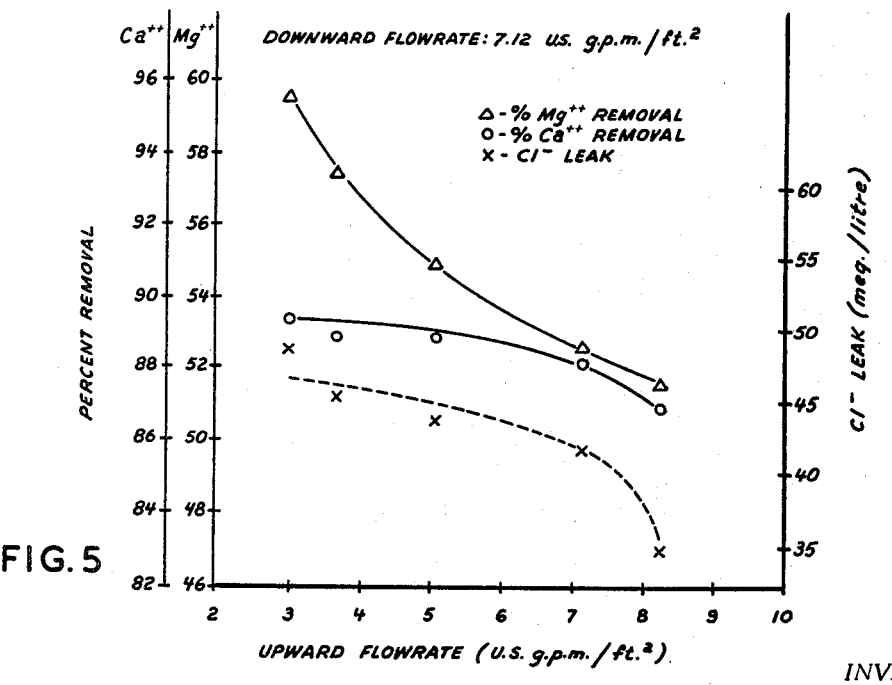
Figure 7:
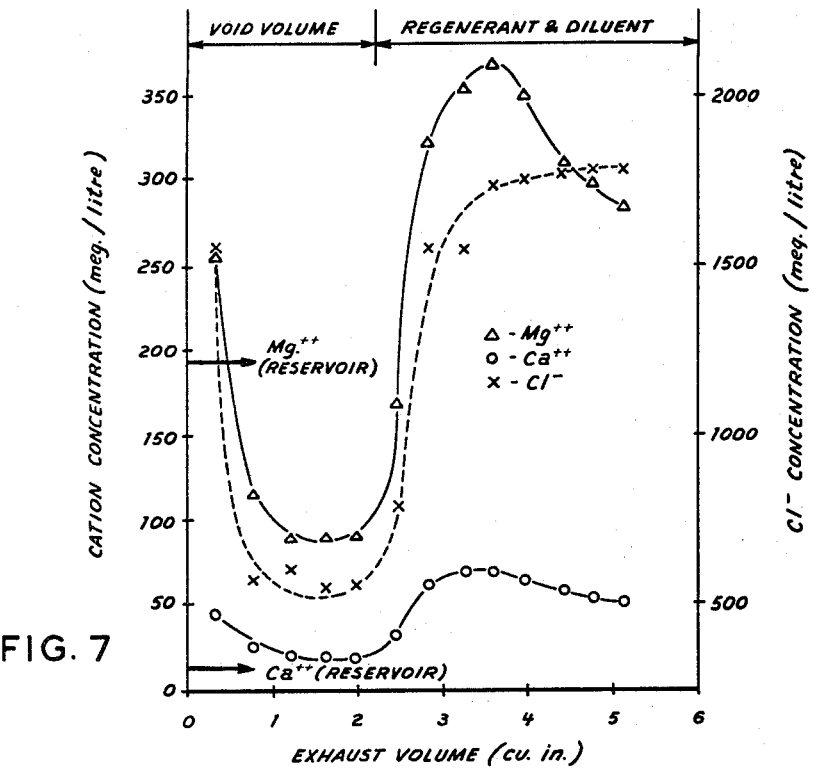
Figure 8:
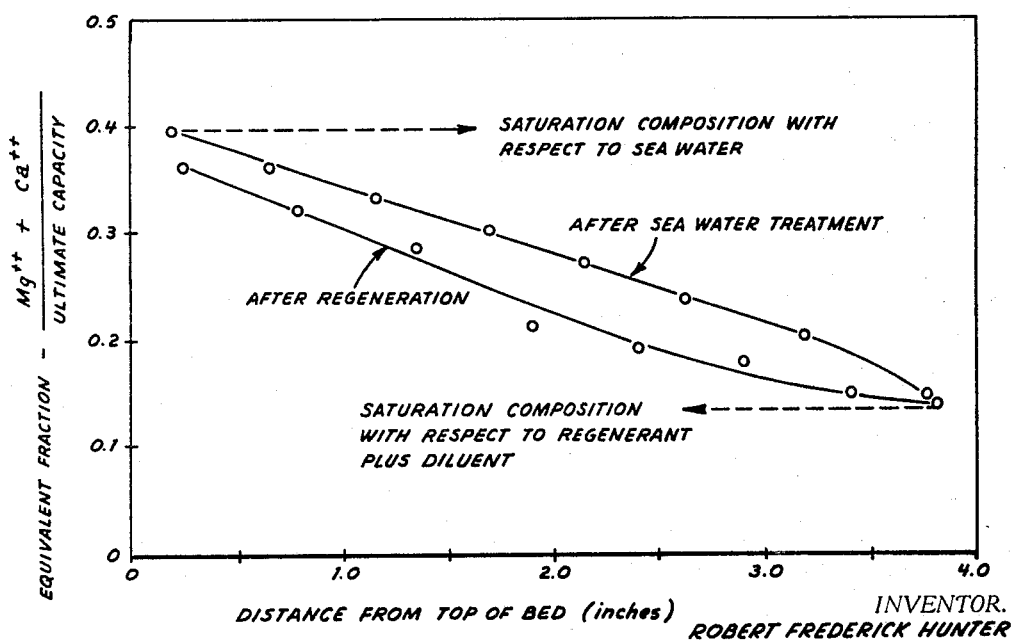

Other objects and advantages of this invention will become apparent from the following detailed disclosure, taken in conjunction with the appended drawings, in which:

FIGURES 1, 2, 3 and 4 are schematic diagrams illustrating suitable equipment for carrying out different methods embodying this invention, FIGURES 5 and 6 are graphs showing the effects of upward and downward flow rates respectively on softening efficiency for a process carried out as specified in Example 2 hereinafter, FIGURE 7 shows exhaust profile curves for the process of Example 2, and FIGURE 8 shows bed profiles for the process of Example 2.

In cases where this invention is applied using absorptive particles in the fixed bed, any suitable absorptive particles such as charcoal, silica gel, activated alumina, etc., may be employed.

The invention also may be practised using any type of ion exchange particles in the fixed bed. Thus, insofar as cation exchangers are concerned, any of the following, which are exemplary only, may be used: carbonaceous exchangers including sulfonated coals and resinous exchangers containing sulfonic acid groups, carboxylic acid groups, or phenolic groups. In the case of anion exchangers those of the type described in United States Patents Numbers 2,198,874, 2,259,169, 2,354,671, 2,246,527, 2-151,883 2,362,086 2,402,386, 2,341,907 and 2,251,234 and which include, for example, resins made by condensing aromatic polyamines and aldehydes with or without carbohydrates and with or without ketones and aliphatic polyalkylene polyamines with aldehydes and ketones with or without phenols, etc., may be employed, for example.

As descriptive examples of this invention, reference will henceforth be made to ion exchange processes, and the usual terms regenerant and solution will be used to describe the two fluids between which some or all of their ionic ingredients are exchanged by use of an intermediate ion exchange resin. It is understood, of course, that the designation of one fluid as the regenerant and one as the solution is purely arbitrary, but must be consistent for any given process. In an absorption process a stripping liquid is employed, this being the equivalent to a regenerant in an ion exchange process. It is to be understood that the term regenerant, as used herein in descriptions of an ion exchange process, is to be construed as including a stripping liquid in an absorptive process.

Figure 1:
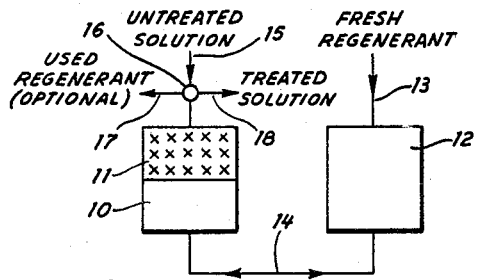

In FIGURE 1 there is shown an ion exchange column 10 containing and partly filled with a bed 11 of ion exchange particles. A reservoir 12 for regenerant, which is introduced thereto via a line 13, is provided. Reservoir 12 is connected to the bottom of column 10 by a line 14. A solution to be treated can be introduced into the top of column 10 via a line 15 and a three-way four port valve 16, which may be solenoid operated, for example. Used regenerant may be removed via a line 17, while treated solution is removed via a line 18, both lines 17 and 18 being connected to valve 16 and hence to the top of column 10.

Figure 2:
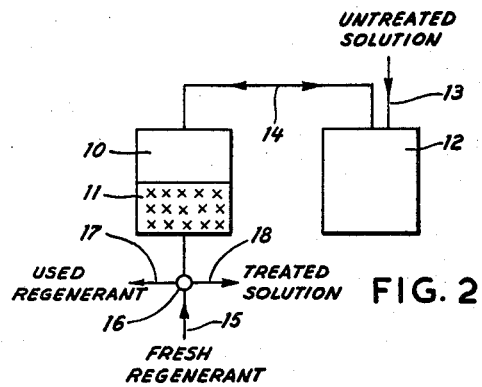

The apparatus shown in FIGURE 2 is the same as that shown in FIGURE 1 except that reservoir 12 is for solution to be treated, which is introduced thereto via line 13, while regenerant is passed into column 10 through line 15 and three-way, four port valve 16. In FIGURE 2 bed 11 is at the bottom of column 10 rather than at the top thereof, as in FIGURE 1.

In FIGURE 3 there are reservoirs 12 and 12a for solution and regenerant respectively, these being introduced thereto via lines 13 and 13a respectively. Two three-way, three-port valves 16 and 16a are provided. Lines 17 and 18 serve the same purpose as in FIGURES 1 and 2 but are connected to valves 16 and 16a respectively, while reservoir 12 is connected via line 14 and through valve 16 to the top of column 10, and reservoir 12a is connected via line 14a and through valve 16a to the bottom of column 10. In FIGURE 3 column 10 is completely filled with bed 11.

In accordance with the preferred embodiment of this invention, there is provided a method for treating a solution to remove at least some of one component thereof using a column that contains a bed of particles of the ion exchange or absorptive type that require periodic regeneration and which are adapted to remove this component from the solution. The column has an upper and a lower inlet, and at least a part of the bed is interposed in the liquid-flow path between these inlets, with the upper inlet being above and the lower inlet below this part of the bed. The method involves alternately passing into the column through one of the inlets, and at least part way through the bed, a solution to be treated, and into the column through the other of the inlets, and at least part way through the bed, a regenerant solution. The amount of the solution to be treated which is passed into the column is sufficient to displace from and actually displaces from the column at least a part of the regenerant solution previously passed into the column and to at least partially exhaust the capacity of the bed. The amount of the regenerant solution passed into the column is sufficient to displace from and actually displaces from the column at least a part of the solution to be treated previously passed into the column and to at least partially regenerate the bed. The regenerant and solution differ in density. The denser of the two solutions always is passed into the column through the lower inlet and always is so displaced from the column through an opening, which may be the lower inlet, located below the upper inlet and the aforementioned part of the bed. The less dense of the two solutions always is passed into the column through the upper inlet and always is so displaced from the column through an opening, which may be the upper inlet, located above the lower inlet and the aforementioned part of the bed. Thus the less dense solution always is kept above the more dense solution.

Specific embodiments of this method may be carried out in the schematically shown equipment of FIGURES 1 to 3. In FIGURE 1 two modes of operation are possible. Thus there may be full reciprocation of both solution and regenerant, i.e., neglecting the effect of molecular and eddy diffusion transfer between the two fluids, the same volume of solution and regenerant that enters column 10 is removed therefrom only at the same end from which it entered. Referring to FIGURE 1, regenerant, which is assumed to be more dense than the solution to be treated, flows from reservoir 12 through line 14 into column 10 through its bottom opening. Bed 11 is regenerated during passage of regenerant therethrough, and solution to be treated previously introduced into column 10 through its top inlet via line 15 and valve 16 is displaced from column 10 by the regenerant via valve 16 and line 18, thereby to provide a source of treated solution. Valve 16 is then moved so as to permit solution to be treated to be passed into column 10 via line 15 and valve 16. The solution passes through bed 11, exchanges the undesired ion or ions therein in so passing through the bed, and displaces the regenerant previously introduced into the column. This regenerant is reciprocated to reservoir 12 via line 14. The process then is repeated. Obviously the faster it is repeated, the more nearly continuous will be the flow of treated solution in line 18. Generally speaking, in the region where the solution and regenerant contact each other there will be a volume of fluid which is essentially a mixture of the two. This volume may be exhausted via line 17 immediately subsequent to the flow of treated solution through line 18 being stopped.

As an alternative, using the apparatus of FIGURE 1, full reciprocation of solution and partial reciprocation of regenerant may be practised. In this case all of the solution introduced into column 10 is reciprocated, i.e., all of it is displaced from the column through the same end from which it entered, i.e., the top end, whereas only some fraction of the total regenerant entering the column undergoes this type of flow, the remaining portion being removed from the opposite end of the column from which it entered, i.e., via line 17, and thus passing in only one direction through the column. Thus, whereas in practise and in accordance with the first method, the only flow, if any, through line 17 is that represented by the small volume of regenerant contaminated with solution, or vice-versa, which contamination occurs at the interface between the regenerant and solution, in accordance with the second method, used regenerant not contaminated with solution to be treated is exhausted via line 17.

FIGURE 2 shows an arrangement which permits full reciprocation of regenerant and partial reciprocation of solution. Thus, solution from reservoir 12 flows into column 10 and through bed 11, exchanging ions and displacing all of the regenerant previously passed into column 10 via line 15 and valve 16, the used regenerant flowing from column 10 via valve 16 and line 17. Treated solution is obtained via line 18. Subsequently regenerant is introduced into column 10 reciprocating some or all of the solution in column 10 back to reservoir 12 and regenerating bed 11.

The arrangement of FIGURE 3 permits partial reciprocation of both solution and regenerant. In this case only a part of the solution and regenerant passed through column 10 is reciprocated to the respective reservoirs, the other part of the solution being derived as treated solution via line 18, and the other part of the regenerant flowing through line 17 as used regenerant. Only the portions of the solution or regenerant filling the column and lines when the respective flows are reversed are reciprocated.

If the solution rather than the regenerant is the more dense liquid, it must be introduced into the bottom of the column below bed 11, while the regenerant must be introduced into the top of the column above the bed. In FIGURE 1, for example, this would involve using reservoir 12 as a solution reservoir and line 15 for the introduction of regenerant.

In all of the arrangements one or both of the fluids may be recycled to a reservoir for reuse or retreatment. However, when a fluid is fully reciprocated, some portion or all of the fluid volume, or some portion of the fluid's exchangeable or exchanged ions, may not be recycled and may be removed separately as a product or waste stream or in a product or waste stream if a steady state exchange is to occur. For example, considering FIGURE 1, the fully reciprocated regenerant can be recycled to a reservoir if it, when contacting the solution, gives up some of its exchangeable or exchanged components to the solution. This can occur by molecular and eddy diffusion at the front between the two fluids when contact is made in the column. The solution in turn can split into two or more product streams, one of which will contain a large portion of exchangeable or exchanged components from the regenerant, and which will be removed via line 17, while the other part is removed via line 18. In FIGURE 1, less mixing of the two fluids thus occurs in the recycle reservoir 12, since the more highly mixed portion of one of the fluids is removed separately as a product stream. This will be true for any arrangement if the more highly mixed portion of one of the fluids is removed separately. Otherwise, this mixed portion will enter a reservoir. This may not necessarily be undesirable if the solution and regenerant are miscible, because the small volume of solution or regenerant contaminating the regenerant or solution respectively may be classifiable as a solvent or diluent for incoming fresh material added to the reservoir. For example, if the reservoir fluid is the regenerant, fresh regenerant can be added to the reservoir, either continuously or intermittently per cycle, either as a dissolvable solid or a concentrated fluid. The portion of the other fluid containing some regenerant that has mixed therewith, can now act as a dissolving solvent for a solid regenerant or a diluent for a concentrated regenerant fluid. The simplest method of operation on fast recycle is to have the reservoir regain a specific level or volume each cycle by adding the consumed quantity of fresh regenerant (or solution) externally, and then merely allowing the fluid from the column to fill the reservoir to the required level.

This method of operation is particularly suited to the treatment of fluids having a very high concentration of exchanging species, e.g., 0.5 normal solutions and over. The nature of the reciprocating process makes it possible to treat very small volumes of fluid per cycle, the fluids being so highly concentrated in exchangeable species that even a fully regenerated bed would be exhausted with passage of only a few bed void volumes of solution. Since rapid cycles are possible with simple automation, this method appears to be suitable for the treatment of concentrated solutions by ion exchange that, in the past, was prevented by high capital costs. Small amounts of one or both of the fluids, for example less than one void volume of the bed, can be used per cycle even though the column, which need not be completely filled by the retained bed, can be completely filled by such fluid, since the portion remaining in the column can be displaced by the other fluid with little mixing in the manner hereinbefore described, and recycled to a reservoir for reuse or retreatment. This reservoir is the same one from which the fluid is again carried to the column during the next cycle. This recycle of one or both of the fluids is in general necessary and a prerequisite for the treatment of small amounts of fluids having a very high concentration of exchangeable species.

If the two fluids are partially miscible only or immiscible, such a procedure as aforementioned may not be desirable.

It already has been pointed out that the more dense fluid must be introduced into and displaced from the column through a lower opening or openings, while the lighter fluid must be introduced into and displaced from the column through an upper opening or openings. The reason for this should now be apparent and is to reduce the intermixing of the two fluids, this being achieved when the lighter phase is maintained above the heavier phase. Of course, the density of each phase need not be uniform throughout the phase as long as all parts of the lighter phase are less dense than all parts of the heavier phase.

The methods described in connection with FIGURES 1 and 2 are useful when a separation of species contained in one of the fluids is required, and this can be performed on one of the fully reciprocated flows as described previously. In cases where the solution contains suspended matter, the methods described in connection with FIGURE 1 are useful in that a reasonable exchange can occur without the necessity of recycling a part or all of the solution in the column to a reservoir, which would have the effect of causing some or all of the suspended matter to re-enter the reservoir, since the recycle fluid has acted as a backwash in the reciprocating action. Such a situation would necessitate some means of removing the suspended matter either prior to or after flow to or from the column. In cases where the regenerant has an amount of suspended matter, the method described in connection with FIGURE 2 is useful for the same reasons as noted above with respect to the solution in connection with FIGURE 1. The methods for FIGURES 1 and 2 are particularly suitable for the preservation of profiles in the solution and/or regenerant after the respective fluids have passed through the bed, since free space on one or both ends of the bed can accommodate a fluid without disturbing solute gradients piror to reciprocation. The method of FIGURE 3 also can be so arranged with free space on either or both ends of the bed, but generally for the application of the method of FIGURE 3 such spaces are not necessary. These applications will be commenced presently. Such preservation of solution profiles formed on passing in one direction through the bed may be useful in helping to form a new type of profile when the fluid is passed back through the bed on reciprocation. It is likely that the final profile will have completely different and possibly more useful characteristics than the profile formed on passing the fluid through the bed in only one direction. Generally speaking, the arrangements shown in FIGURES 1 and 2 are easily automated and require a minimum of valving and controls to effect a completely automatic operation. The arrangement of FIGURE 3, although still easily automated, involves more controls than the other arrangements. If the solution flow rate is much faster than that of the regenerant, the arrangements of FIGURE 1 can give a longer on-stream time for solution product flow per cycle than the arrangements of FIGURES 2 and 3 operating at the same solution and regenerant flow rates, and with the same volumes of outlet, non-recycled streams. If the regenerant flow rate is equal to or greater than the solution flow rate, the arrangement of FIGURE 3 can give a longer on-stream time for solution product flow per cycle than the methods of FIGURES 1 and 2 operating at the same solution and regenerant flow rates and with the same volumes of outlet, non-recycled streams.

The method described in connection with FIGURE 3 is particularly adaptable for the use of very fine resin beads in short fixed beds that completely fill the column, since the product streams have not been reciprocated, and thus cannot lose efficiency by possible re-exchange on the reverse flow. Unless separations, as discussed hereinafter, are being performed, loss in overall exchange efficiency can occur with reciprocated flows, particularly when very fine mesh resin is employed. When very fine resin can be employed, such as in the arrangement of FIGURE 3, fast flows with consequent very short cycle times are possible. As previously noted in connection with FIGURE 3, two reservoirs are provided to accommodate the recycle of both fluids that are left in the column and reciprocated. However, if one of the fluids is of little value in its unexchanged or largely unexchanged state, the portion of this fluid remaining in the column when flow thereof is stopped can be discarded to waste, rather than recycled. This would be particularly necessary for the treatment of a fluid, such as sea water, that has high fouling characteristics. In fact, when such a procedure is combined with rapid cycles and reciprocating flow, the operation is ideally suited for high fouling fluids, since the fouling material is not given a prolonged opportunity to agglomerate, and is therefore more easily removed.

It will be seen from the foregoing that in the preferred embodiment of the reciprocating flow aspect of this invention fluid rinses and backwash flows, as distinct from the solution and regenerant flows, are eliminated, thus resulting in a considerable saving insofar as both equipment cost and cycle time are concerned. The preferred cycle consists only of regeneration and treatment, with the solution and regenerant being brought into direct contact, this in turn being made practically feasible by virtue of the small degree of intermixing of the solution and regenerant which takes place when the lighter phase is maintained above the lower phase.

It should be noted, however, that rinsing may be practised if desired. Thus, in any one of the arrangements shown in FIGURES 1–3, either the solution or regenerant may from time-to-time be replaced by a rinse. The same considerations regarding density apply, however, and if the rinse takes the place of the regenerant, for example, and is heavier than the solution, the rinse must be introduced into and displaced from the column through an opening or openings below the bed, i.e., the lighter fluid must be maintained above the heavier fluid no matter what combination of two of rinse, regenerant or solution is being employed.

Another method for performing a rinsing operation is shown in FIGURE 4. In this figure untreated solution is introduced into the bottom of column 10 via line 15 and three-way, three port valve 16a, treated solution being obtained via line 18. Similarly, fresh regenerant is introduced into the bottom of column 10 via line 13 and three-way, three port valve 16b, while used regenerant is exhausted via line 17. Rinse is supplied to the top of column 10 via a line 20 and three-way, three port valve 16c, while used rinse is exhausted via this valve and a line 21. The rinse is less dense than either the solution to be treated or the regenerant, but the solution and regenerant may have the same or different densities. In operation, solution to be treated is passed through bed 11 and then is displaced via valve 16a and line 18 by rinse. Fresh regenerant then is introduced into the column via line 13 and valve 16b displacing the rinse, which is removed via valve 16c and line 21. After regeneration of bed 11, more fresh rinse is introduced via line 20 and valve 16c displacing the regenerant via valve 16b and line 17. Solution then is reintroduced to column 10 and the cycle repeated. A part of the solution and/or a part of the regenerant may be reciprocated to a reservoir or reservoirs, of course.

The fixed bed need not fill the entire column and may be located anywhere in the column. For example, it may be desirable to have free space in the column on the outlet side of the bed for one of the fluids, so that a larger volume of this fluid can be fully reciprocated in the column. One advantage of this is that if low contamination of the two fluids is desirable, a larger volume passing through the bed will give a lower average contamination after the more highly mixed portion is removed.

Another feature of having free space in the column under or above the bed is that any concentration gradient formed in the solution or regenerant on passing through the bed can be preserved and made to contact the bed with this gradient on the reverse stroke through the bed. Such a situation may be useful in developing a more concentrated solution of a stripped species in an absorption process by "squaring up" the species profile when the initial profile is passed back through the bed.

Yet another feature of having free space in the column under and/or above the bed is to permit the development at steady state of a fluid of intermediate density between that of the solution and regenerant, this fluid constituting a fairly highly mixed portion of regenerant and solution and being capable of still acting as either a regenerant or a solution, but not both, in the exchange with the resin. This plug of mixed fluid is maintained at a reasonably fixed average concentration under steady state conditions by removing the portion that spreads into either the solution or regenerant per cycle and adding the portion of solution and/or regenerant that spreads into the plug. This plug of fluid then can be classed as either regenerant or solution, and it can be the main fluid contacting the resin for either the solution or regenerant exchange, the actual solution or regenerant fluid, but not both, never contacting the resin. This plug undergoes the same reciprocating action as described previously.

While, in accordance with this invention a backwash is eliminated as a separate part of the cycle, the function of a backwash is accomplished by the action of the two fluids themselves when short cycles are employed. For example, in that the heavier liquid must always remain under the lighter one, a portion or all of each fluid must reverse its flow direction in the column and exit at the same end it entered. Such rapid changes in direction of flow automatically classify and purge the column of suspended matter. Also, since the contact time of each fluid in the bed per cycle can be made very small, fluids, such as supersaturated solutions which one may wish to treat, or which may form in the bed, can be treated so that nucleation and growth is not given sufficient time to occur in the bed, and thus a difficult backwashing of such material is avoided.

In the practise of this invention it is very desirable to employ very short beds, e.g., less than six inches. Beds of such length permit rapid cycling and can be retained at both the bottom and the top by a screen or the like, such that movement of the resin is minimized even at very fast flows in either direction. Such retention facilitates the maintenance of a sharp front between the solution and regenerant when the fluid is passing through the column. The rapid changes in direction of flow through the bed eliminate the need for a free space for a fluidization backwash. Also, the rapid changes in direction prevent the retaining material from blinding or plugging. Due to shrinkage of the beads in either the solution or regenerant, generally the bed is not entirely stationary during the complete operation but moves slightly as a plug when the flows are reversed.

The use of short beds also makes it practical to use finer mesh exchange material than is normally employed in longer beds. This permits faster flow rates and even faster cycles. Also, the use of fine beads (50–200 mesh, for example) reduces the hydrodynamic mixing at the regenerant and solution interface and the contamination due to the finite diffusion rates of constituents of one fluid coming from the resin beads when the bead is contacted with the other fluid.

It is desirable, although not essential, to employ calming devices such as horizonal impingement baffles at openings into the column to further reduce hydrodynamic mixing of the fluids when one is being introduced into or removed from the column.

According to United States Patent No. 1,978,447, a solution containing a single exchangeable species can act as its own regenerant when passed back through the bed in the opposite direction to that in which it originally flowed. It has been found also that the degree to which this occurs depends on the flow rate at which the fluid is passed back through the bed, the particle size of the active medium and its properties, and the affinity of the exchanged ion for the active medium in its unregenerated form. If the fluid undergoing complete reciprocation contains two or more different or chemically distinct exchangeable species that are also different from the regenerated form of the active medium, the degree to which these different species are removed from the bed when the exchanged solution is passed back through the bed will depend on the factors mentioned above. If the species differ sufficiently in their affinity for the exchangeable material, these species will not be distributed uniformly in the reciprocated fluid, and by proper fractionation of the fluid, some degree of separation of the exchangeable species is possible. It is also possible that some or all of the species will be more concentrated in the separated fractions than they were in the original fluid. Proper control of flow rate, together with judicial choice of the exchangeable material, can enhance the separation. The regenerant fluid which is displacing the other fluid from the column can perform some actual regeneration of the bed, but this will always be less than the total exchange that occurred on the solution exchange. The use of a short bed combined with available free space in the column means that the solution can reverse its direction through the bed without leaving the column by displacement with a fluid which will assist to some degree in regeneration of the bed.

It has been found that the reciprocation of fluids permits a completely automatic operation in a much simpler manner than that employed in the prior art. For example, three, three-way solenoid valves with two electronic relays can accomplish the same duty as two or more five port valves operating with electric timers with suitable automatic valves for switching flows from on-stream to off-stream columns or vice-versa.

Another feature of this invention is the discovery that small amounts, for example less than one void volume of the column, of one or both of the fluids can be used per cycle even though the column, which need not be completely filled by the retained bed, can be completely filled by such fluid, since the portion remaining in the column can be displaced by the other fluid, with little mixing, in the manner hereinbefore described, and recycled to a reservoir for reuse or retreatment. This reservoir is the same one from which the fluid is again carried to the column during the next cycle.

The following examples serve to illustrate certain applications of the principles of this invention, but are not to be construed as limiting the invention.

*Example 1*

A glass tube of approximately 1.22 inches internal diameter was filled to a depth of about 1.12 inches with 21 cubic centimeters of a water wet and swollen granular cation exchange resin, "Dowex 50" (Trademark), in sodium form having 12% divinylbenzene. The ion exchange resin in its wet form was composed of rounded granules of from 100 to 200 mesh per inch size as measured with standard Tyler screens. The length of the glass tube was sufficient only to accommodate the resin, a retaining screen and a rubber stopper at each end. Both rubber stoppers were provided with a single round opening and a glass baffle covering the opening approximately 0.68 inch in diameter, 0.12 inch thick and 0.12 inch away from the inside face of the stopper. The external valving, consisting of two, three-way solenoid valves connected to the bottom outlet and one three-way solenoid valve connected to the top outlet of the tube was made to operate automatically via suitable electronic relay systems in such a manner that the bed was alternatively contacted with a tap water having 2.76 meq./litre original hardness, and then with a regenerant containing largely sodium chloride as the solute. The object of the experiment was to soften the tap water. The flows were arranged as in FIGURE 3 in that a portion of each fluid was allowed to flow completely through the bed in only one direction, while the portion remaining in the tube when flow of either fluid was stopped was reciprocated and displaced from the column by the other fluid. The regenerant fluid was the heavier liquid and therefore entered the bottom of the tube. The reciprocated regenerant was recycled to a reservoir which regained a specific level each cycle due to re-entry of reciprocated regenerant and addition of fresh regenerant and diluent. The diluent came from the tube and constituted a small volume of the other fluid, in this case tap water which contained some mixed regenerant. The reciprocated tap water was not recycled but merely was dispelled with the used regenerant. Flows were metered volumetrically by the use of electric level sensing contacts in reservoirs. These metering reservoirs emptied automatically by the use of solenoid drain valves connected electrically to the operation of the resin bed. The complete operation was automatic. Table 1, experiment 1, lists the conditions and results for three representative runs using this arrangement and chemical system. In addition to the results shown, it was found that 90% of the ultimate capacity of the bed was in the unregenerated form after regeneration, and that the bed was almost completely saturated with the hardness producing ions after contact with the tap water at the cyclic steady state for run 3. Thus, the change in composition of the bed on the solution and regeneration exchanges was only about 10% of the ultimate capacity of the bed.

*Example 2*

The same basic equipment and flow arrangement as noted in Example 1 were used with the tap water being replaced by a synthetic sea water having 108.0 meq./litre original hardness consisting of 89.6 meq./litre magnesium and 18.4 meq./litre calcium. The bed depth was also changed to 4.0 inches using the same resin type and mesh size. The purpose of this experiment was to partially soften the sea water. The conditions for two runs are shown in Table 1, experiment 2, and the results are shown graphically in FIGURES 5 and 6.

FIGURE 7 shows the concentration profiles of magnesium, calcium and chloride in the exhaust solution for downward and upward flow rates of 7.12 g.p.m./sq. ft. The summation of the magnesium and the calcium concentrations constitutes the total hardness. The curves of FIGURE 7 indicate that the more accessible magnesium and calcium are being removed and not the less accessible portions on the bed, since the volume containing the largest concentrations of these ions constitutes a large fraction of the regenerant plus diluent volume used for this experiment. Since the fractional loading of the bed was only about 6.0% of the ultimate capacity of the bed, the regenerant need only remove the more accessible portions of calcium and magnesium. For the same overall bed loading, it can be seen by approximate extrapolation that the volume of regenerant required to completely regenerate the bed to the equilibrium value with respect to the fluid would be very large, since the concentration curves of both the magnesium and the calcium would approach the actual concentrations of these ions in the reservoir fluid in an almost exponential manner.

FIGURE 8 shows the axial bed composition profiles with respect to total hardness at times just after regeneration (for example, the regenerant has reciprocated to the reservoir) and just after treatment of the sea water for a downward flow rate of 7.12 g.p.m./sq. ft. and an upward flow rate of 5.0 g.p.m./sq. ft. The curve shows that the top of the bed remains largely saturated with respect to the composition of the inlet sea water, while the bottom of the bed remains largely saturated with respect to the composition of the regenerant employed. Both profiles extend essentially the length of the bed. Except for regions very near the ends of the bed, the profiles are not only both substantially linear but approximately parallel, indicating that the magnesium and calcium were removed in approximately equal quantity throughout the bed with the exception of the extreme ends. The chloride leak indicated on FIGURES 5, 6 and 7 measures the degree of contamination of the sea water by the regenerant.

*Example 3*

A glass tube of approximately .875 inch internal diameter and 29.5 inches in length was fitted with a bed of cation exchange resin, "Dowex 50," containing 4% divinylbenzene. The bed was 3.0 inches deep, the top of the bed being located 1.0 inch from the top of the inside of the tube. The ion exchange resin in its dry form was composed of rounded granules of from 20 to 50 mesh per inch size, as measured with standard Tyler screens. The bed was held in place by suitable screening and metal supporting rings at both ends. The tube was fitted with rubber stoppers containing baffles as described in Example 1. The space under the bed in the tube amounted to approximately 8.33 times the bulk volume of the bed. The external valving, consisting of two three-way solenoid valves connected to the top outlet was made to work automatically via suitable electronic relay systems in such a manner that the bed was alternatively contacted with a solution containing 2,000 p.p.m. as calcium carbonate, and then with a regenerant containing largely sodium chloride as a solute. Flows were arranged as in FIGURE 1 in that each fluid was fully reciprocated in the tube by displacement with the other fluid. The regenerant fluid was the heavier liquid and entered the bottom of the tube. The reciprocated regenerant was recycled to a reservoir which regained a specific level each cycle due to the re-entry of reciprocated regenerant and addition of fresh solid regenerant in an amount equal to that dissolved on the previous cycle. The reciprocated solution was not recycled but was split into two parts, one part being a fraction low in contamination by the regenerant, and the other part being a fraction that was high in contamination by the regenerant. The one portion constituted treated product solution, while the other part constituted consumed regenerant located in a portion of the upper solution. Flows were metered as described in Example 1. Using a downward flow rate of 5.0 g.p.m./sq. ft., and upward flow rate of 35.0 g.p.m./sq. ft. and a regenerate concentration of 8.0% by weight sodium chloride, the steady state exchange of calcium for sodium in the solution product was 59.7% of the total original calcium. The overall flow rate for the cycle was 4.2 g.p.m./sq. ft. with a complete cycle time of 4.0 minutes. Sodium chloride consumption amounted to 2.3 times the theoretical amount required to exchange the calcium that was removed from the product solution. The regenerant contamination of the solution product, as indicated by the concentration of chloride ion was 8.9 meq./litre. The amount of solution containing the higher contamination by regenerant amounted to 6.5% of the total solution product volume.

*Example 4*

A glass tube of approximately 1.25 inches internal diameter and 12 inches in length, was fitted with a bed of anion exchange resin, "Dowex 1" containing 8% divinylbenzene. The bed was 5.5 inches deep, the top of the bed being 0.25 inch from the top of the inside of the tube. The ion exchange resin in its dry form was composed of rounded granules of from 20 to 50 mesh per inch size, as measured with standard Tyler screens. The bed was held in place by suitable screening and metal supporting rings at both ends. The tube was fitted with rubber stoppers containing baffles as described in Example 1. The space under the bed in the tube amounted to approximately 1.1 times the bulk volume of the bed. The external valving, consisting of two three-way valves connected to the top outlet was made to operate such that the bed was alternately contacted with a solution containing 5.4% by weight sulphuric acid and 14.0% by weight ferrous sulfate, and then with a stripping fluid consisting of pure distilled water. The object of the experiment was to effect to some degree a separation of sulphuric acid and ferrous sulfate by utilizing an anion exchange resin to act as a selective absorbent for the acid. This absorbed acid and any small amount of absorbed ferrous sulfate can be stripped by water in this case. Flows were arranged as in FIGURE 1 with one fluid, the water, being fully reciprocated in the tube, while the sulphuric acid-ferrous sulfate solution was partially reciprocated. The sulphuric acid-ferrous sulfate solution was the heavier liquid and entered the bottom of the tube. The reciprocated heavy fluid discharging from the bottom of the tube was recycled to a reservoir which regained a specific level each cycle due to the re-entry of reciprocated fluid and addition of fresh sulphuric acid-ferrous sulfate solution in an amount equal to that removed from the top outlet of the tube on the previous cycle. The reciprocated stripping solution (originally water) was not recycled but was split into two parts, one part being a fraction high in acid and low in ferrous sulfate, the other part being a fraction that had a lower acid to iron ratio than the first part. This latter part was included wih the nonreciprocated heavy fluid discharged from the top of the tube. This fluid, on emerging from the top of the column was partially stripped of its acid and thus had a lower acid to iron ratio than the original solution. A downward flow rate of 2.0 g.p.m./sq. ft. and an upward flow rate of 34.5 g.p.m./sq. ft. for removal or reciprocation of the high acid portion, and an upward flow rate of 2.3 g.p.m./sq. ft. for removal of the second fraction of the stripping solution and non-reciprocated heavy fluid were used. The sulphuric acid-ferrous sulfate solution added per cycle was 58 cubic centimeters, while the total heavy fluid removed from the top also was 58 cubic centimeters. The stripping solution constituted a 75 cubic centimeter portion of high acid fluid and a 10 cubic centimeter portion which was included with the heavy fluid discharging from the top of the tube. The total cycle time was 145 seconds. The concentrations of sulphuric acid and ferrous sulfate in the stripping solution (75 cubic centimeter fraction) were found to be 315 meq./litre and 58.7 meq./litre respectively, while these concentrations were 875 meq./litre and 1,910 meq./litre respectively in the other fluid discharged from the top of the tube. The original solution contained concentrations of sulphuric acid and ferrous sulfate of 1,386 meq./litre and 2,160 meq./litre respectively. Thus a high acid product was obtained with an acid to iron ratio of 5.35, as opposed to a ratio of .64 in the original solution, and the total acid recovery was 29.4%.

*Example 5*

A glass tube of approximately 1.25 inches internal diameter and 20.3 inches in length, was fitted with a bed of cation exchange resin, "Dowex 50" containing 16% divinylbenzene. The bed was 6.5 inches deep, the bottom of the bed being 0.25 inch from the bottom of the inside of the tube. The ion exchange resin in its dry form was composed of ground granules of from 100 to 200 mesh per inch size, as measured with standard Tyler screens. The bed retaining devices and the stoppered ends of the tube were as described in Example 1. The space above the retained bed amounted to 2.1 times the bulk volume of the bed. The external valving, consisting of two, three-way valves connected to the bottom outlet was made to operate such that the bed was alternatively contacted with a solution containing 1,010 meg./litre calcium ion, and then with a regenerant consisting of a sodium chloride solute having a concentration of 1,940 meq./litre. The object of the experiment was to exchange sodium for calcium in a concentrated solution. Flows were arranged as in FIGURE 2 in that the regenerant was fully reciprocated in the tube, while the solution was partially reciprocated. The regenerant was the heavier liquid and entered and discharged from the bottom of the tube. The solution that discharged from the top was recycled to a reservoir which was operated as described in Example 4 with fresh solution being added in a cyclic manner to the reservoir. The solution discharging from the bottom was split into two portions. The portion high in contamination with regenerant was discharged with the reciprocated regenerant, and the other portion was collected as treated solution. None of the reciprocated regenerant was recycled to a reservoir, but was merely expelled. An upward flow rate of 7.0 g.p.m./sq. ft. and a downward flow rate of 3.8 g.p.m./sq. ft. were employed. The volume of regenerant that was reciprocated per cycle was 268 cc., while the total solution volume discharging from the bottom was 173 cc., 25 cc. of which were included with the reciprocated regenerant. At the steady state 50.0% of the calcium had exchanged for sodium in the treated solution. The regenerant contamination in the treated solution amounted to 50 meq./litre. Total cycle time was 220 seconds.

TABLE 1

| Item | Units | Example Number | | | | |
|---|---|---|---|---|---|---|
| | | 1 | 1 | 1 | 2 | 2 |
| | | Run Number | | | | |
| | | 1 | 2 | 3 | 1 | 2 |
| Downward flow rate (solution discharge) | G.p.m./ft.$^2$ | 24.5 | 24.6 | 24.6 | 7.12 | Variable |
| Downward flow rate (regenerant recycle) | G.p.m./ft.$^2$ | 2.05 | 2.14 | 2.12 | 7.12 | Variable |
| Upward flow rate | G.p.m./ft.$^2$ | 2.15 | 2.08 | 2.07 | Variable | 7.12 |
| Cycle time | Seconds | 171.6 | 200.0 | 370 | 70–105 | 55–107 |
| Treated solution volume per cycle | Cc | 1,140.0 | 1,140.0 | 1,140.0 | 150.0 | 150.0 |
| Exhaust [1] volume per cycle | Cc | 41.0 | 58.0 | 154.0 | 88.5 | 88.5 |
| Diluent volume per cycle | Cc | 23.7 | 41.0 | 137.0 | 13.0 | 13.0 |
| Regenerant volume per cycle | Cc | 3.8 | 3.5 | 3.5 | 38.0 | 38.0 |
| Total hardness of inlet solution | Meq./litre | 2.75 | 2.78 | 2.76 | 108.0 | 108.0 |
| Total hardness of regenerant | Meq./litre | 0.01 | .008 | .008 | 223.9 | 223.9 |
| Total hardness of treated solution | Meq./litre | 0.0 | 0.0 | 0.0 | Variable | Variable |
| Total hardness of exhaust | Meq./litre | 76.0 | 58.0 | 20.3 | 262–277 | 264–272 |
| Total hardness of reservoir fluid | Meq./litre | 0.6 | 0.15 | .02 | 194–206 | 205–212 |
| Total hardness removal from solution | Percent | 100 | 100 | 100 | Variable | Variable |
| Chloride concentration in inlet solution | Meq./litre | 0.85 | 0.87 | 0.86 | 535.0 | 535.0 |
| Chloride concentration in regenerant | Meq./litre | 1,990.0 | 2,015.0 | 2,015.0 | 2,140.0 | 2,140.0 |
| Chloride concentration in treated solution | Meq./litre | 1.85 | 1.15 | 0.91 | Variable | Variable |
| Chloride concentration in exhaust | Meq./litre | 197.0 | 140.0 | 45.6 | 1,195–1,220 | 1,200–1,230 |
| Chloride concentration in reservoir fluid | Meq./litre | 452.0 | 224.0 | 53.5 | 1,830–1,920 | 1,805–1,860 |
| Regeneration efficiency | Ratio of theor. | 2.37 | 2.2 | 2.22 | Variable | Variable |
| Contamination of treated solution by regenerant | Meq./litre | 1.0 | 0.28 | 0.05 | 35.0–49.0 | 41.0–43.0 |

[1] Exhaust = Reciprocated solution plus Regenerant plus Dilutant (for these examples).

What I claim as my invention is:

1. In a process of treating a liquid solution containing a component to remove at least a part of the component from the solution by passing the solution through a fixed bed of particles capable of taking up the component from the solution, in which there are solution treatment steps in which the solution is passed vertically through the bed, and regeneration steps in which a liquid regenerant capable of taking up the component from the bed is passed vertically through the bed, the improvement which comprises alternately and continuously passing the solution and regenerant into opposite ends of a column containing the bed so that solution remaining in the column from a solution treatment step is displaced from the column by regenerant and regenerant remaining in the column from the regeneration step is displaced from the column by solution, the more dense of the two liquids being passed into the column from the bottom, and the less dense of the two liquids being passed into the column from the top, so that liquid remaining in the column from a preceding step is displaced from the column at the bottom if it is the more dense liquid, and is displaced from the column at the top if it is the less dense liquid, and so that whenever the liquids are in contact during the cycle, the more dense of the two liquids is below the less dense.

2. A process as claimed in claim 1, in which there is no free space in the column above or below the bed, part of the more dense liquid passed into the column is passed completely through the column and the more dense liquid remaining in the column at the end of the more dense liquid step is displaced from the column at the bottom by the less dense liquid, part of the less dense liquid passed into the column is passed completely through the column and the less dense liquid remaining in the column at the end of the less dense liquid step is displaced from the column at the top by the more dense liquid.

3. A process as claimed in claim 2, in which at least one of the liquids so displaced from the column is separated into a fraction contaminated with the other liquid and a fraction substantially uncontaminated with the other liquid.

4. A process as claimed in claim 1, in which the bed is at the top of the column with a free space below the bed, part of the more dense liquid passed into the column is passed completely through the column, and all of the less dense liquid passed into the column is displaced from the column at the top by the more dense liquid.

5. A process as claimed in claim 4, in which the more dense liquid passed completely through the column is separated into a fraction contaminated with the less dense liquid and a fraction substantially uncontaminated with the less dense liquid.

6. A process as claimed in claim 1, in which the bed is at the top of the column with a free space below the bed, all of the less dense liquid passed into the column is displaced from the column at the top of the column and is separated into a fraction contaminated with more dense liquid and a fraction substantially uncontaminated with more dense liquid, and none of the more dense liquid is passed completely through the column except that displaced at the top of the column with said fraction of the less dense liquid.

7. A process as claimed in claim 6, in which the less dense liquid passed completely through the column is separated into a fraction contaminated with more dense liquid and a fraction substantially uncontaminated with more dense liquid.

8. A process as claimed in claim 1, in which the bed is at the bottom of the column with a free space above the bed, part of the less dense liquid passed into the column is passed completely through the column, and all of the more dense liquid passed into the column is displaced from the column at the bottom by the less dense liquid.

9. A process as claimed in claim 1, in which the bed is at the bottom of the column with a free space above the bed, all of the more dense liquid passed into the column is displaced from the column at the bottom of the column and is separated into a fraction contaminated with less dense liquid and a fraction substantially uncontaminated with less dense liquid, and none of the less dense liquid is passed completely through the column except that displaced at the bottom of the column with said fraction of the more dense liquid.

References Cited

UNITED STATES PATENTS 2,484,647  10/1949  Roberts _____ 210—35
2,855,364  10/1958  Roberts _____ 210—35
2,891,007   6/1959  Caskey et al. _____ 210—35

SAMIH N. ZAHARNA, *Primary Examiner.*

MORRIS O. WOLK, *Examiner.*

E. G. WHITBY, *Assistant Examiner.*